United States Patent
Lewis

(10) Patent No.: US 7,058,568 B1
(45) Date of Patent: Jun. 6, 2006

(54) VOICE QUALITY IMPROVEMENT FOR VOIP CONNECTIONS ON LOW LOSS NETWORK

(75) Inventor: Gary M. Lewis, Derry, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/484,159

(22) Filed: Jan. 18, 2000

(51) Int. Cl.
*G10L 19/00* (2006.01)
(52) U.S. Cl. .................. 704/214; 704/201; 370/516; 375/226
(58) Field of Classification Search ............... 704/214, 704/201; 370/230–420, 516; 375/226
See application file for complete search history.

(56) References Cited

U.S. PATENT DOCUMENTS

| | | | | |
|---|---|---|---|---|
| 4,538,259 | A * | 8/1985 | Moore | 370/394 |
| 5,825,771 | A * | 10/1998 | Cohen et al. | 370/270 |
| 5,963,551 | A * | 10/1999 | Minko | 370/356 |
| 6,049,565 | A * | 4/2000 | Paradine et al. | 375/217 |
| 6,078,882 | A * | 6/2000 | Sato et al. | 704/233 |
| 6,160,633 | A * | 12/2000 | Mori | 358/1.5 |
| 6,259,691 | B1 * | 7/2001 | Naudus | 370/352 |
| 6,282,192 | B1 * | 8/2001 | Murphy et al. | 370/238 |
| 6,298,055 | B1 * | 10/2001 | Wildfeuer | 370/352 |
| 6,301,258 | B1 * | 10/2001 | Katseff et al. | 370/412 |
| 6,452,950 | B1 * | 9/2002 | Ohlsson et al. | 370/516 |
| 6,453,290 | B1 * | 9/2002 | Jochumson | 704/231 |
| 6,504,838 | B1 * | 1/2003 | Kwan | 370/352 |
| 6,522,746 | B1 * | 2/2003 | Marchok et al. | 379/406.03 |
| 6,526,140 | B1 * | 2/2003 | Marchok et al. | 379/406.03 |
| 6,549,587 | B1 * | 4/2003 | Li | 375/326 |
| 6,658,027 | B1 * | 12/2003 | Kramer et al. | 370/516 |

OTHER PUBLICATIONS

Schulzrinne, H. et al., "RTP: A Transport Protocol for Real-Time Applications," STD 1, RFC 1889, Internet Engineering Task Force (Jan., 1996), no day.

* cited by examiner

*Primary Examiner*—W. R. Young
*Assistant Examiner*—Michael N. Opsasnick
(74) *Attorney, Agent, or Firm*—Hamilton, Brook, Smith & Reynolds, P.C.

(57) ABSTRACT

The type of audio stored in the payload of a data packet transmitted over a data network is identified as speech audio or non-speech audio through the use of a non-speech identifier included in a header in the data packet. Upon detection of data packet containing non-speech audio, the receiver of the data packet may modify jitter buffer latency while the non-speech audio is being received. Modifying the jitter buffer latency while non-speech audio is being received minimizes the loss of spoken words during jitter buffer latency modification.

22 Claims, 6 Drawing Sheets

VOICE QUALITY IMPROVEMENT FOR VOIP CONNECTIONS ON LOW LOSS NETWORK

BACKGROUND OF THE INVENTION

Real-time audio, such as a telephone conversation may be transmitted over a data network, such as the Internet. The audio transmitted during the telephone conversation includes desired audio (spoken words) and undesired audio (background noise), such as the sound of the air conditioner. While words are being spoken the transmitted audio contains both spoken words and background noise. While words are not being spoken, the transmitted audio contains only background noise.

To transmit real-time audio over the data network, an audio packet transmitter in the source stores the audio in the payload of one or more data packets and transmits the data packet over the data network. Each data packet includes a destination address in a header included in the data packet.

Unlike a telephone network in which there is a dedicated connection between the source and the destination, each data packet may travel on a different path from the source to the destination in a data network and some data packets may travel faster than others. Thus, data packets transmitted over the data network may arrive out of order at the receiver.

To compensate for these path differences, an audio packet receiver in the destination stores the received data packets in a jitter buffer and forwards the stored audio to the listener at the rate at which it was generated in the audio packet transmitter in the source. Jitter buffer latency is the period of time that the received data packet is stored in the jitter buffer being forwarded to the listener. Thus, the jitter buffer latency is the delay after which the receiver forwards the received data packet to the listener. The jitter buffer latency is dependent on the size of the data packet being transmitted and the slowest path between the source and the destination. However, if data packets are not being received on the slowest path, the jitter buffer latency may be reduced.

Thus, in a low loss network, the inter-packet arrival time is monitored and the jitter buffer latency is modified dependent on the inter-packet arrival time, in order to minimize the delay. This modification of the jitter buffer latency is performed while no spoken words are being transmitted so as to minimize the loss of spoken words.

One standard protocol for packetizing real-time audio for transmission over a data network is the Real-Time Transport Protocol ("RTP") (Request for Comments ("RFC") 1889, Jan. 1996) at http:// www.ietf.org/rfc/rfc1889.txt. The RTP provides a method for a transmitter to detect the start of a period in which the audio does not contain spoken words. The period in which the audio does not contain spoken words is sometimes called "a period of silence" even though it is not true silence because the audio contains background noise. Upon detecting a period of silence the transmitter may either transmit no data packets during the period of silence or transmit non-speech audio (background noise with no spoken words). By transmitting no data packets during a period of silence, the audio packet receiver may adjust the jitter buffer latency while no data packets are being transmitted and the number of spoken words lost is minimized.

Thus, to minimize the number of spoken words lost while the jitter buffer latency is modified, the transmitter does not transmit non-speech audio packets during the period of silence. During the period of silence, the receiver generates comfort noise to reconstruct background noise for the listener. The receiver forwards the comfort noise to the listener. Comfort noise is generated and forwarded to reassure the listener that the telephone conversation has not ended. The comfort noise reduces the quality of the real-time audio because the listener hearing comfort noise during a period of silence in a telephone conversation instead of background noise receives a negative indication or impression that the telephone conversation is being transmitted over a data network instead of a telephone network.

SUMMARY OF THE INVENTION

A non-speech identifier is stored in a data packet if the data packet contains non-speech audio. The non-speech audio in the data packet is identified dependent on the state of the non-speech identifier. Upon detection of a data packet containing non-speech audio; jitter buffer latency modification is enabled. Upon detection of a data packet containing speech audio; jitter buffer latency modification is disabled.

The non-speech identifier may be a one bit field stored in the header of the data packet. The header may be the Real-time Transport Protocol header. The one bit field is set to a first of two states if the type of audio stored in the data packet's payload is non-speech audio and set to a second state if the type of audio stored in the data packet's payload is speech audio.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
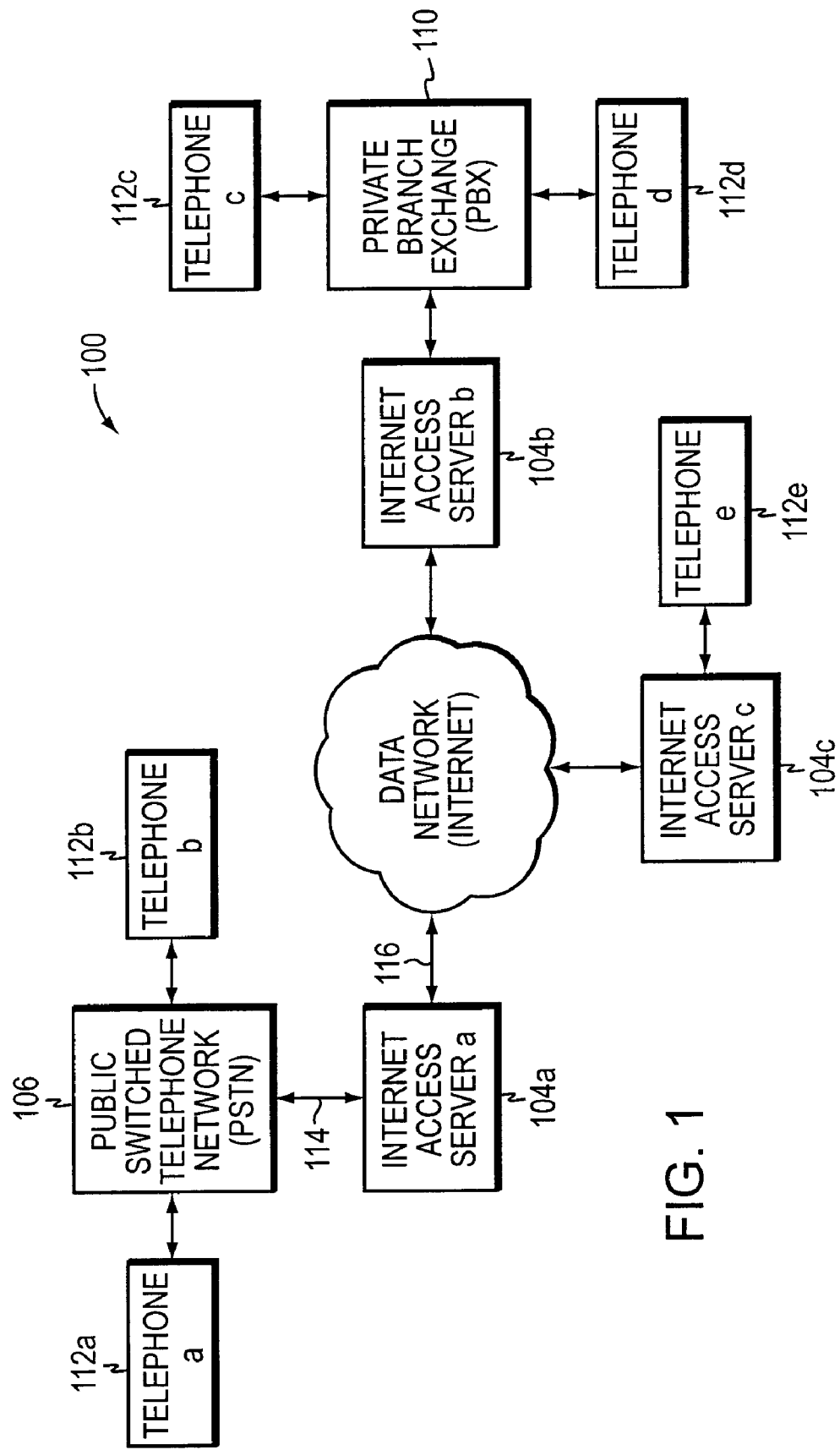
FIG. 1 illustrates a data network including an Internet access server for transmitting audio on the Internet according to the principles of the present invention.

FIG. 1 illustrates a data network 100 including Internet access servers 104a–c transmitting real-time audio on the Internet according to the present invention. The real-time audio input to the Internet access servers 104a–c may originate in telephones 112a–b connected to a Public Switched Telephone Network ("PSTNs") 106 or telephones 112c–d connected to Private Branch Exchange ("PBXs") 110, or a telephone 112e directly connected to an Internet access server 104c. The Internet access server 104 may be a personal computer. The Internet access servers 104a–c packetize the real-time audio by portioning the real-time audio into payloads and storing the payload and an associated header in a data packet. The Internet access server 104a–c transmits the data packet to another Internet access server 104. Upon receiving the data packet, the Internet access server 104 removes the header and forwards the real-time audio stored in the payload of the data packet to a destination. The destination is dependent on the destination address included in the header of the data packet. A non-speech identifier stored in the header of the data packet identifies the type of audio stored in the payload. The type of audio stored in the payload is either speech audio or non-speech audio. If the type of audio is non-speech audio the audio stored in the payload is background noise. If the type of audio is speech audio the audio stored in the payload is spoken words and background noise.

For example, to transmit audio from telephone 112a to telephone 112e, audio originating in telephone 112a is forwarded to Internet access server 104a through the PSTN 106. Transmitting Internet access server 104a samples the audio and divides the sampled audio into payloads. Internet access server 104a generates a network data packet by adding a network header to the payload. The header includes a destination address for the data packet and a non-speech identifier identifying the type of audio stored in the payload as speech audio or non-speech audio.

The data packet is forwarded on the Internet dependent on the destination address included in the header. Receiving Internet access server 104c determines from the destination address included in the header of the data packet that the destination address is telephone 112e, removes the header from the data packet and forwards the audio stored in the payload to telephone 112e.

To transmit audio from telephone 112e to telephone 112a, Internet access server 104c packetizes the audio forwarded from telephone 112e and Internet access server 104a de-packetizes the data packets and forwards the audio to telephone 112a through the PSTN 106.

Thus, to transmit audio on the Internet, the audio is packetized by an Internet access server 104a–c, forwarded on the Internet and de-packetized by the Internet access server 104a–c after it is received from the Internet.

Figure 2:
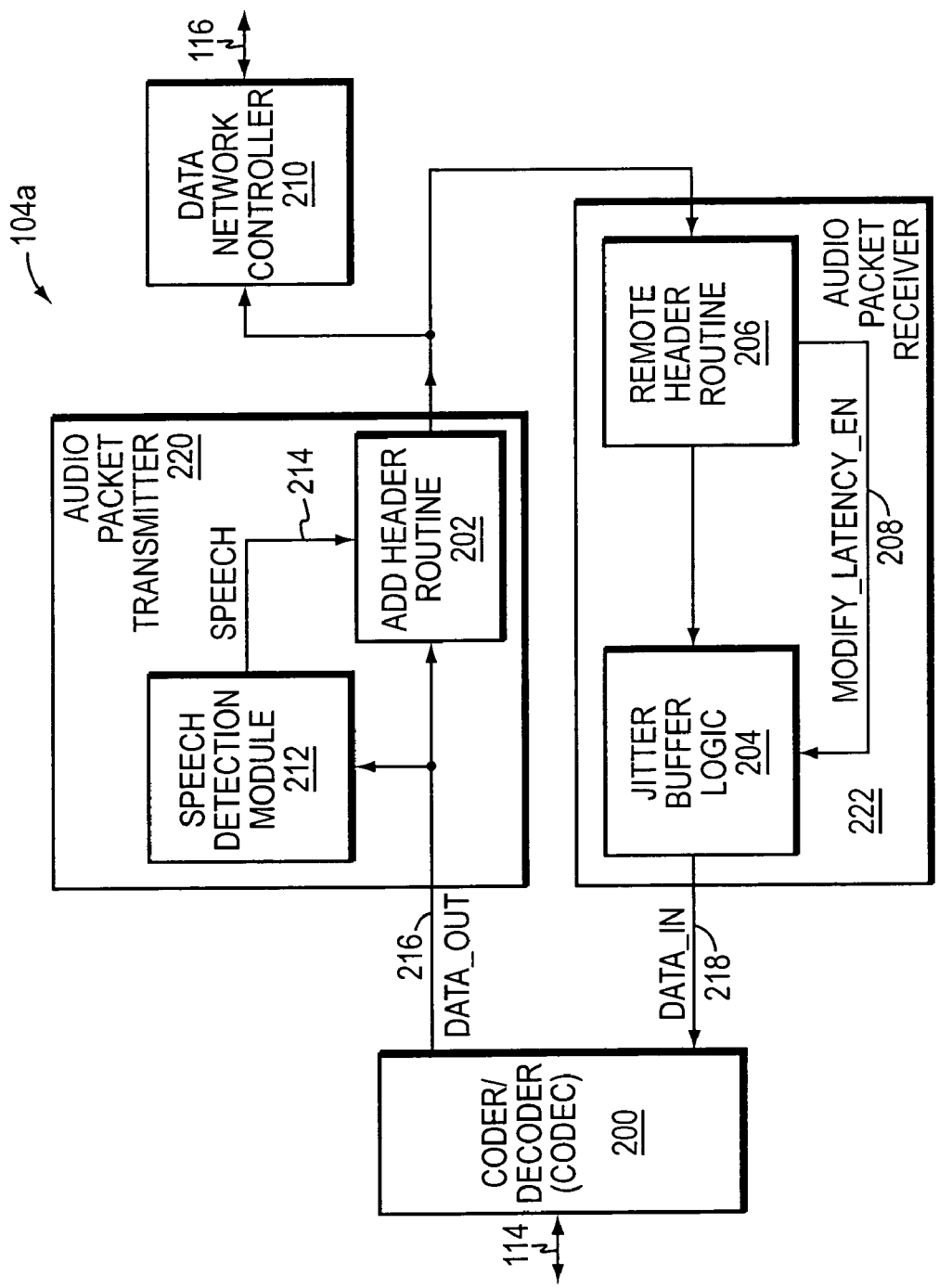
FIG. 2 illustrates any one of the Internet access servers shown in FIG. 1.

FIG. 2 illustrates Internet access server 104a shown in FIG. 1. The Internet access server includes a Coder/Decoder ("CODEC") 200, an audio packet transmitter 220, an audio packet receiver 222 and a data network controller 210. The audio packet transmitter 220 includes an add header routine 202 and a speech detection module 212. The audio packet receiver 222 includes a remove header routine 206 and jitter buffer logic 204.

The CODEC 200 samples the audio input signal received on voice port 114. For example, if the CODEC implements the G.711 protocol the audio input is sampled 8,000 times per second. The sampled audio signal is converted into a digital format and encoded into frames.

The add header routine 202 in the audio packet transmitter 220 generates a network data packet by adding data network protocol headers to the encoded frame or payload received from the CODEC 200. The data packet is forwarded to a data network controller 210, such as an Ethernet controller. The data network controller 210 transmits the data packet on the Internet through the data network interface 116. The speech detection module 212 in the audio packet transmitter 220 determines whether the type of audio stored in the encoded frame is speech audio or non-speech audio and forwards a speech identifier 214 to the add header routine 202. The add header routine 202 sets the state of a non-speech identifier in the header of the data packet dependent on the state of the speech identifier 214 forwarded from the speech detection module 212. The audio packet transmitter 220 forwards the data packet to the data network controller 210.

Figure 3:
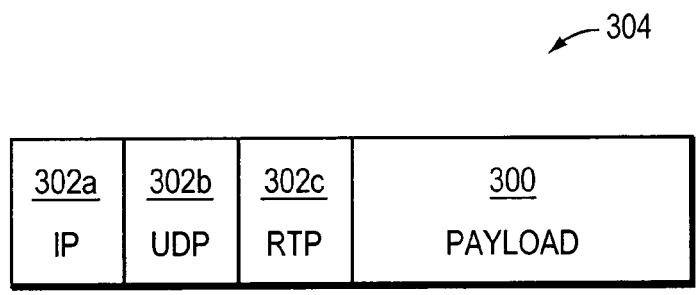
FIG. 3 illustrates a prior art Real-time Transport Protocol ("RTP") data packet including an RTP header transmitted by the Internet access server shown in FIG. 2.

FIG. 3 illustrates a data packet 304 including prior art data network headers 302a–c which may be added to the encoded frame received from the CODEC 200 by the add header routine 202 (FIG. 2). The data packet 304 includes a payload 300. The audio forwarded in the encoded frame is stored in the payload 300 of the data packet 304. The headers 302a–c include an Internet Protocol ("IP") header 302a, a User Datagram Protocol ("UDP") header 302b and a Real-time Transport Protocol ("RTP") header 302c.

Figure 4:
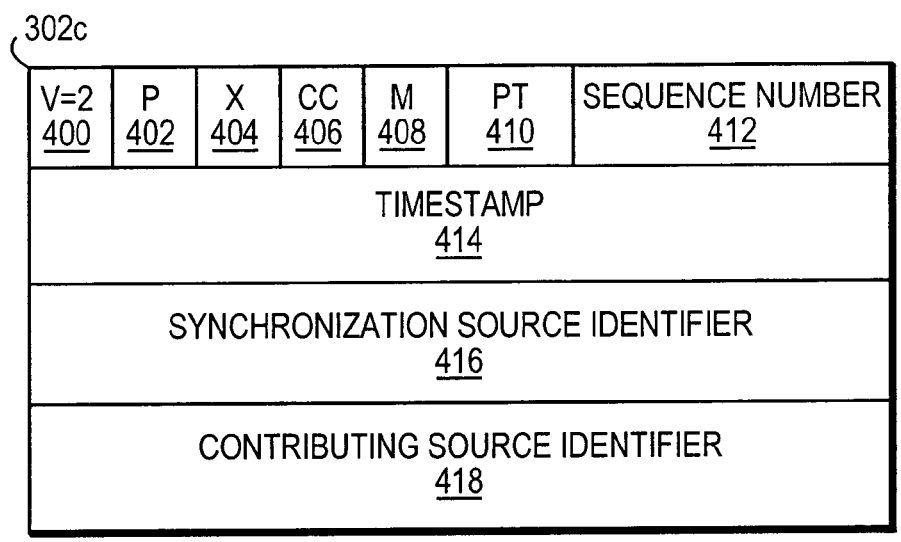
FIG. 4 illustrates the format of the prior art RTP header shown in FIG. 3.

FIG. 4 illustrates the format of the prior art RTP header 302c shown in FIG. 3. The RTP header 302c includes the following fields: version 400, padding 402, extension 404, contributing source count 406, marker 408, payload type 410, sequence number 412, timestamp 414, synchronization source identifier 416 and contributing source identifier 418.

The version 400 field identifies the version of the RTP header 302c. The version shown in FIG. 4 is version 2. The padding 402 field indicates whether the payload 300 (FIG. 3) includes padding octets. The extension 404 field indicates whether the RTP header 302c includes an extension header. The marker 408 field is user definable. In the embodiment shown, the marker 408 field is one bit wide. The use of the marker 408 field is described in later in conjunction with FIGS. 2, 5 and 6.

The payload type 410 field identifies the format of the payload 300 (FIG. 3). The sequence number 412 field increments by one for each RTP data packet transmitted, it may be used by the receiver to detect lost data packets and to restore data packet sequence if data packets arrive out of order. The timestamp 414 field stores a timestamp dependent on the time the payload 300 (FIG. 3) was sampled. The synchronization source identifier 416 field identifies the synchronization source. The contributing source identifier 418 field identifies the contributing sources for the payload 300 (FIG. 3).

Returning to FIG. 2 the add header routine 202 generates a data packet 304 (FIG. 3) by adding an IP header 302a (FIG. 3), a UDP header 302b (FIG. 3) and an RTP header 302c to the payload 300 (FIG. 3) forwarded from the CODEC 200 on data-out 216.

The add header routine 202 stores a non-speech identifier, identifying the type of audio stored in the payload 300 (FIG. 3) of the data packet 304 (FIG. 3). The non-speech identifier is stored in the marker 408 (FIG. 4) field in the prior art RTP header 302c (FIG. 3). The marker 408 (FIG. 4) field is a one bit wide field. The marker 408 (FIG. 4) field is set '1' if the type of audio stored in the payload 300 (FIG. 3) is non-speech audio and set '0' if the type of audio stored in the payload 300 (FIG. 3) is speech audio.

Figure 5:
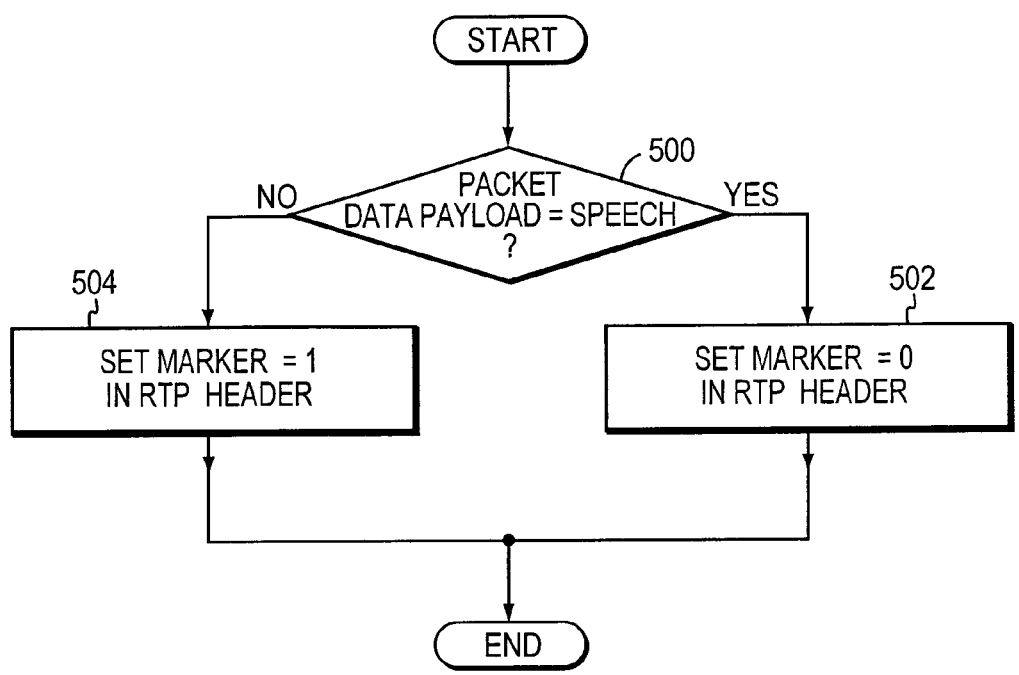
FIG. 5 is a flowchart illustrating the steps implemented in the add header routine in the audio packet transmitter shown in FIG. 2 for storing a non-speech identifier in the data packet's header.

FIG. 5 is a flowchart illustrating the steps in the add header routine 202 (FIG. 2) for storing a non-speech identifier identifying the type of audio stored in the payload 300 (FIG. 3) in the data packet's RTP header 302c (FIG. 3) before the data packet 304 (FIG. 3) is transmitted on the data network.

At step 500, the add header routine 202 (FIG. 2) determines if the audio stored in the payload 300 (FIG. 3) of the data packet is speech audio dependent on the state of the speech identifier 214 (FIG. 2) forwarded from the speech detection module 212 (FIG. 2). If the speech identifier 214 (FIG. 2) indicates that the type of audio stored in the payload 300 (FIG. 3) is speech, audio processing continues with step 502. If not, processing continues with step 504.

At step 502, the marker 408 (FIG. 4) field in the RTP header 302c (FIG. 4) is set to '0' identifying the type of audio stored in the payload 300 (FIG. 3) as speech audio.

At step 504, the marker 408 (FIG. 4) field in the RTP header 302c (FIG. 4) is set to '1' identifying the type of audio stored in the payload 300 (FIG. 3) as non-speech audio.

Figure 6:
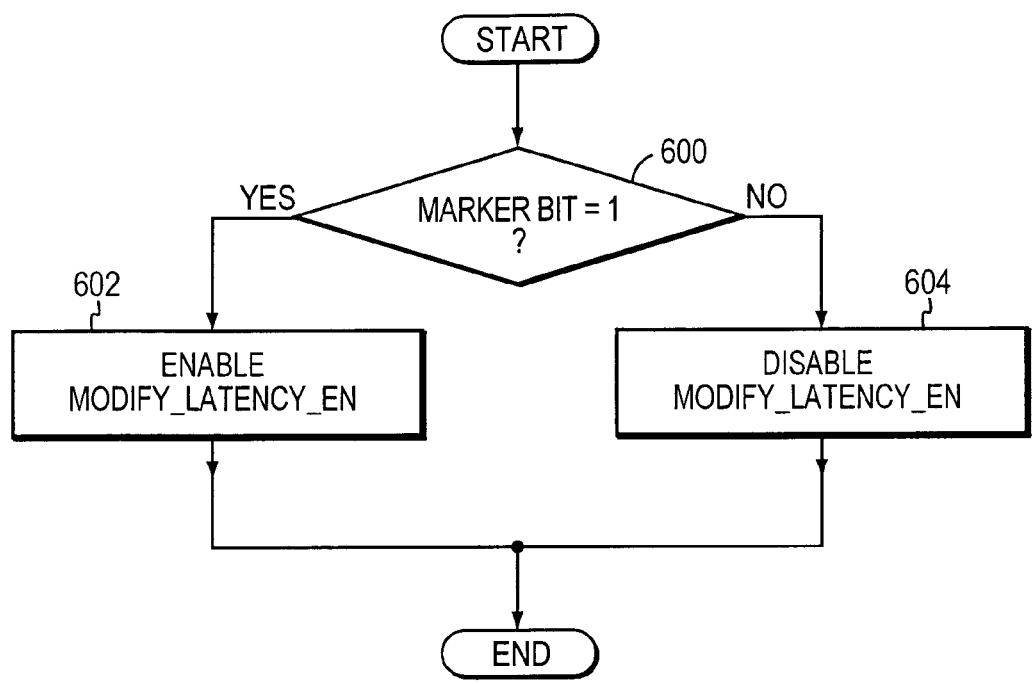
FIG. 6 is a flowchart illustrating the steps implemented in the remove header routine in the audio packet receiver shown in FIG. 2 for detecting non-speech data in a data packet's's payload dependent on the state of the non-speech identifier stored in the data packet's header.

FIG. 6 is a flowchart illustrating the steps in the remove header routine 206 (FIG. 2) in the audio packet receiver 222 (FIG. 2) for detecting the type of audio stored in the payload 300 (FIG. 3) of the received data packet 304 (FIG. 3).

At step 600, the remove header routine 206 (FIG. 2) examines the state of the marker 408 (FIG. 4) field stored in the RTP header 302c (FIG. 4) in the received data packet 304 (FIG. 4).

If the marker 408 (FIG. 4) field is set to '1', processing continues with step 602. If not, processing continues with step 604.

At step 604, the remove header routine 206 (FIG. 2) disables modify_latency_en 208 upon detecting that the type of audio stored in the payload 300 (FIG. 3) of the received data packet's payload is speech audio. The jitter buffer logic 204 (FIG. 2) may not modify the jitter buffer latency which modify_latency_en 208 (FIG. 2) is disabled.

At step 602, the remove header routine 206 (FIG. 2) enables modify_latency_en 208 (FIG. 2) upon detecting that the type of audio stored in the received data packet's payload 300 (FIG. 3) is non-speech audio. While modify-latency_en 208 is enabled, the jitter buffer logic 204 (FIG. 2) may modify the jitter buffer latency. Modifying the jitter buffer latency while the payload 300 (FIG. 3) contains non-speech audio minimizes the loss of spoken words.

Returning to FIG. 2, after the remove header routine 206 has removed the headers 302 (FIG. 3) from the received data packet 304 (FIG. 3), the payload 300 (FIG. 3) is stored in a jitter buffer (not shown) in the jitter buffer logic 204. The jitter buffer logic 204 forwards the stored payload 300 (FIG. 3)—the encoded frames—to the CODEC 200 on data-in 218 dependent on the jitter buffer latency. The CODEC 200 converts the received encoded frame to a format to be transmitted on audio signal 114 (FIG. 1) to the PSTN 106 (FIG. 1).

The invention transmits non-speech audio in the payload of a data packet; that is, background noise with no spoken words. The type of audio stored in the payload of the data packet is identified as by storing a non-speech identifier in the RTP header of the data packet. The standard RTP header is used to identify the type of audio stored in the data packet's payload. Upon detection of non-speech audio in the payload of the data packet, the receiver of the data packet may modify the latency of the jitter buffer without loss of spoken words.

It will be apparent to those of ordinary skill in the art that methods involved in the present invention may be embodied in a computer program product that includes a computer usable medium. For example, such a computer usable medium can consist of a read only memory device, such as a hard drive device or a computer diskette, having computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a system for transmitting audio over a data network; and
wherein received data packets are stored in a jitter buffer in a receiver and read from the jitter buffer at a rate dependent on a jitter buffer latency, which can be modified during periods of quasi silence, an apparatus for determining if a data packet contains non speech audio or speech audio; and
wherein audio received as a data stream is transmitted in one or more transmitted data packets, comprising:
a non speech detection module, which determines whether the received data stream contains non speech audio or speech audio;
an add header routine, which stores a first non speech identifier with the audio in a transmitted data packet, the first non speech identifier being stored in a header in the transmitted data packet; and
a remove header routine, which detects the state of a second non speech identifier in the header of a received data packet to determine if non speech audio is stored in the payload of the received data packet, whereupon the jitter buffer latency can be modified.

2. The apparatus as claimed in claim 1 wherein the non speech identifier is a one bit field included in the header in the data packet.

3. The apparatus as claimed in claim 2 wherein the non speech identifier is stored in a Real time Transport Protocol header.

4. The apparatus as claimed in claim 3 wherein the non speech identifier is set to a first of two states if the data packet contains non speech audio.

5. The apparatus as claimed in claim 3 wherein the non speech identifier is set to a second state if the data packet contains speech audio.

6. The apparatus as claimed in claim 1 wherein the remove header routine determines from the state of the non speech identifier that speech audio is included in the data packet whereupon the jitter buffer latency modification is disabled.

7. An apparatus for determining if a received data packet contains non speech audio or speech audio, wherein received data packets are stored in a jitter buffer in a receiver and read from the jitter buffer at a rate dependent on a jitter buffer latency, which can be modified during periods of quasi silence, comprising:
means for identifying the type of audio received as a data stream;
means for storing a non speech identifier with the audio in a transmitted data packet, the non speech identifier being stored in a header in the transmitted data packet; and
means for detecting the state of the non speech identifier in the header of the received data packet to determine if non speech audio is stored in the payload of the received data packet, whereupon the jitter buffer latency can be modified.

8. In a system for transmitting audio over a data network; and
wherein data packets are stored in a jitter buffer in a receiver and read from the jitter buffer at a rate dependent on a jitter buffer latency, which can be modified during periods of quasi silence, a method for identifying a data packet containing non speech audio or speech audio, comprising the steps of:
generating a non speech identifier which identifies which type of audio is in a transmitted data packet;

storing, by an add header routine, the non speech identifier with the audio in the data packet, the non speech identifier being stored in a header in the transmitted data packet; and detecting, by a remove header routine, the state of the non speech identifier in the header of a received data packet to determine if non speech audio is stored in the payload of the received data packet, whereupon the jitter buffer latency can be modified.

9. The method as claimed in claim 8 wherein the non speech identifier is a one bit field included in a header in the data packet.

10. The method as claimed in claim 9 wherein the non speech identifier is stored in a Real time Transport Protocol header.

11. The method as claimed in claim 10 wherein the non speech identifier is set to a first of two states if the data packet contains non speech audio.

12. The method as claimed in claim 10 wherein the non speech identifier is set to a second state if the data packet contains speech audio.

13. An apparatus for determining if a received data packet contains non speech audio or speech audio, comprising:
   a transmitter, the transmitter comprising:
   an add header routine, which stores a first non speech identifier with the non speech audio in a transmitted data packet, the first non speech identifier being stored in a header in the transmitted data packet; and
   a receiver, the receiver comprising:
   a remove header routine which detects a second non speech audio stored in the payload of the received data packet dependent on the state of the non speech identifier, whereupon the jitter buffer latency can be modified.

14. In a system for transmitting audio over a data network; and
   wherein received audio packets are stored in a jitter buffer in a receiver and read from the jitter buffer at a rate dependent on a jitter buffer latency, which can be modified during periods of quasi silence, an apparatus for determining if a received data packet contains non speech audio or speech audio; and
   wherein audio received as a data stream is transmitted in one or more transmitted packets, comprising:
   a non speech detection module, which determines whether the received data stream contains non-speech audio or speech audio;
   an add header routine, which stores a first non speech identifier with the audio in a transmitted data packet, the first non speech identifier being stored in a one bit field included in a header in the transmitted data packet, the first non-speech identifier set to a first of two states if the data packet contains non-speech audio; and
   a remove header routine, which detects the state of a second non speech identifier in the header of the received data packet to determine if non speech audio is stored in the payload of the received data packet, whereupon the jitter buffer latency can be modified.

15. The system of claim 14, wherein the non-speech identifier is a user definable marker field in a Real time Transport Protocol header.

16. An apparatus for determining if a received data packet contains non speech audio or speech audio comprising:
   means for storing a first non speech identifier with the non speech audio in a transmitted data packet, the first non speech identifier being stored in a one bit field included in a header in the transmitted data packet;
   means for detecting the non speech audio stored in the payload of the received data packet dependent on the state of a second non speech identifier in the header of the received data packet, the second non-speech identifier set to a first of two states if the received data packet contains non-speech audio; and
   means for detecting the state of the second non speech identifier in the header of the received data packet to determine if non speech audio is stored in the payload of the received data packet, whereupon the jitter buffer latency can be modified.

17. An apparatus for receiving audio over a data network comprising:
   a jitter buffer for storing data packets, the data packets read from the jitter buffer at a rate dependent on a jitter buffer latency, which can be modified during periods of quasi silence; and
   a remove header routine, which detects the state of a non speech identifier in the header of a received data packet to determine if non speech audio is stored in the payload of the received data packet, whereupon the jitter buffer latency can be modified.

18. The apparatus of claim 17, wherein the remove header routine determines from the state of the non speech identifier that speech audio is included in the data packet whereupon the jitter buffer latency modification is disabled.

19. The apparatus of claim 17, wherein the non speech identifier is a one bit field included in the header in the data packet.

20. The apparatus of claim 19, wherein the non speech identifier is stored in a Real time Transport Protocol header.

21. The apparatus of claim 20, wherein the non speech identifier is set to a first of two states if the data packet contains non speech audio.

22. The apparatus of claim 20, wherein the non speech identifier is set to a second state if the data packet contains speech audio.

* * * * *